(12) United States Patent
Stong

(10) Patent No.: US 6,982,575 B2
(45) Date of Patent: Jan. 3, 2006

(54) CLOCK RATIO DATA SYNCHRONIZER

(75) Inventor: Gayvin E Stong, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 398 days.

(21) Appl. No.: 10/060,154

(22) Filed: Jan. 30, 2002

(65) Prior Publication Data

US 2003/0141908 A1    Jul. 31, 2003

(51) Int. Cl.
*H03K 5/13*    (2006.01)

(52) U.S. Cl. .................. 327/141; 327/144; 327/145; 375/355

(58) Field of Classification Search ............ 327/141, 327/144, 145, 154; 375/355, 362, 364
See application file for complete search history.

(56) References Cited

U.S. PATENT DOCUMENTS

| | | | | |
|---|---|---|---|---|
| 4,949,361 A | * | 8/1990 | Jackson | 375/371 |
| 5,528,237 A | * | 6/1996 | Moloney et al. | 341/59 |
| 5,896,052 A | * | 4/1999 | Gujral et al. | 327/144 |
| 5,999,023 A | * | 12/1999 | Kim | 327/144 |
| 6,359,479 B1 | * | 3/2002 | Oprescu | 327/141 |

* cited by examiner

*Primary Examiner*—Timothy P. Callahan
*Assistant Examiner*—An T. Luu

(57) ABSTRACT

A clock ratio data synchronizer is provided that utilizes a plurality of flip flops to synchronize data received by the synchronizer from first clock domain logic at a first clock frequency to a clock frequency of second clock domain logic. Each flip flop is capable of sampling data only on an edge of a clock and outputting data only on an edge of the clock. By utilizing flip flops in the synchronizer, data values are only allowed to change on clock edges. This, in turn, greatly improves clock skew tolerance, and also setup time margins for the first clock domain logic and for the second clock domain logic.

17 Claims, 4 Drawing Sheets

CLOCK RATIO DATA SYNCHRONIZER

TECHNICAL FIELD OF THE INVENTION

The present invention is generally related to integrated circuits (ICs) and, more particularly, to a clock ratio data synchronizer for synchronizing data in one frequency domain to another frequency domain.

BACKGROUND OF THE INVENTION

Clock ratio data synchronizers are known and are used to synchronize data moving from one clock frequency domain to another clock frequency domain. For example, clock ratio data synchronizers are known that synchronize data moving from a higher clock frequency domain to a lower clock frequency domain, and vice versa. Currently clock ratio data synchronizers do not provide maximum tolerance between the skews of the clocks of the different clock frequency domains. Maximization of skew tolerance allows for more variation in the clock paths. For example, in cases where both clocks are being generated off-chip, variation between the off-chip clock paths will exist in addition to variation between the on-chip clock paths. As clock frequency increases, the skew tolerance margin (i.e., the maximum allowable difference between the skews) decreases.

With synchronizers used in non-state-of-the-art ICs, the skew tolerance margins are greater because the clocks run at lower frequencies than in state-of-the-art ICs. Consequently, skew tolerance margins were not a big concern. However, with the ever-increasing demand to increase clock frequencies and data rates, current skew tolerance margins are insufficient using previous clock ratio data synchronizers.

Previous synchronizer designs utilize latches. Whatever is on the input of a latch is reflected on the output of the latch when the latch is in the "transparent mode". In the non-transparent mode of the latch, the output holds whatever value was on the output at the time that the signal that enabled the latch was removed. The transparent nature of the latch can potentially cause problems in the upstream logic in terms of the amount of time that the upstream logic has to make the input to the synchronizer valid. Therefore, it is possible that the upstream logic will not be able to meet setup time requirements. This also causes problems with the downstream logic because the downstream logic in the path of the synchronizer output will not always know when it must be ready to receive data, since the data could change at anytime during the time window over which the latch is transparent. These problems result in the aforementioned clock skew tolerance margin as well as setup time margin problems.

Accordingly, a need exists for a clock ratio data synchronizer that maximizes the skew tolerance margins between the clocks of the different domains, thereby allowing more variation to exist in the clock paths. A need also exists for such a synchronizer that will provide certainty with respect to setup time margins as well as potential increases in setup time margins. There is also a need for such a synchronizer that works well with static timing analyzers, and previous synchronizer designs presented many problems for static timing analysis.

SUMMARY OF THE INVENTION

In accordance with the present invention, a clock ratio data synchronizer is provided that utilizes a plurality of flip flops to synchronize data received by the synchronizer from first clock domain logic at a first clock frequency to a clock frequency of second clock domain logic. Each flip flop is capable of sampling data only on an edge of a clock. By utilizing flip flops in the synchronizer, as opposed to latches, data values are only allowed to change on clock edges. This, in turn, greatly improves the clock skew tolerance margin, and the setup time margins for the first clock domain logic and for the second clock domain logic.

These and other features and advantages will become apparent from the following description, drawings and claims.

DETAILED DESCRIPTION OF THE INVENTION

Figure 1:
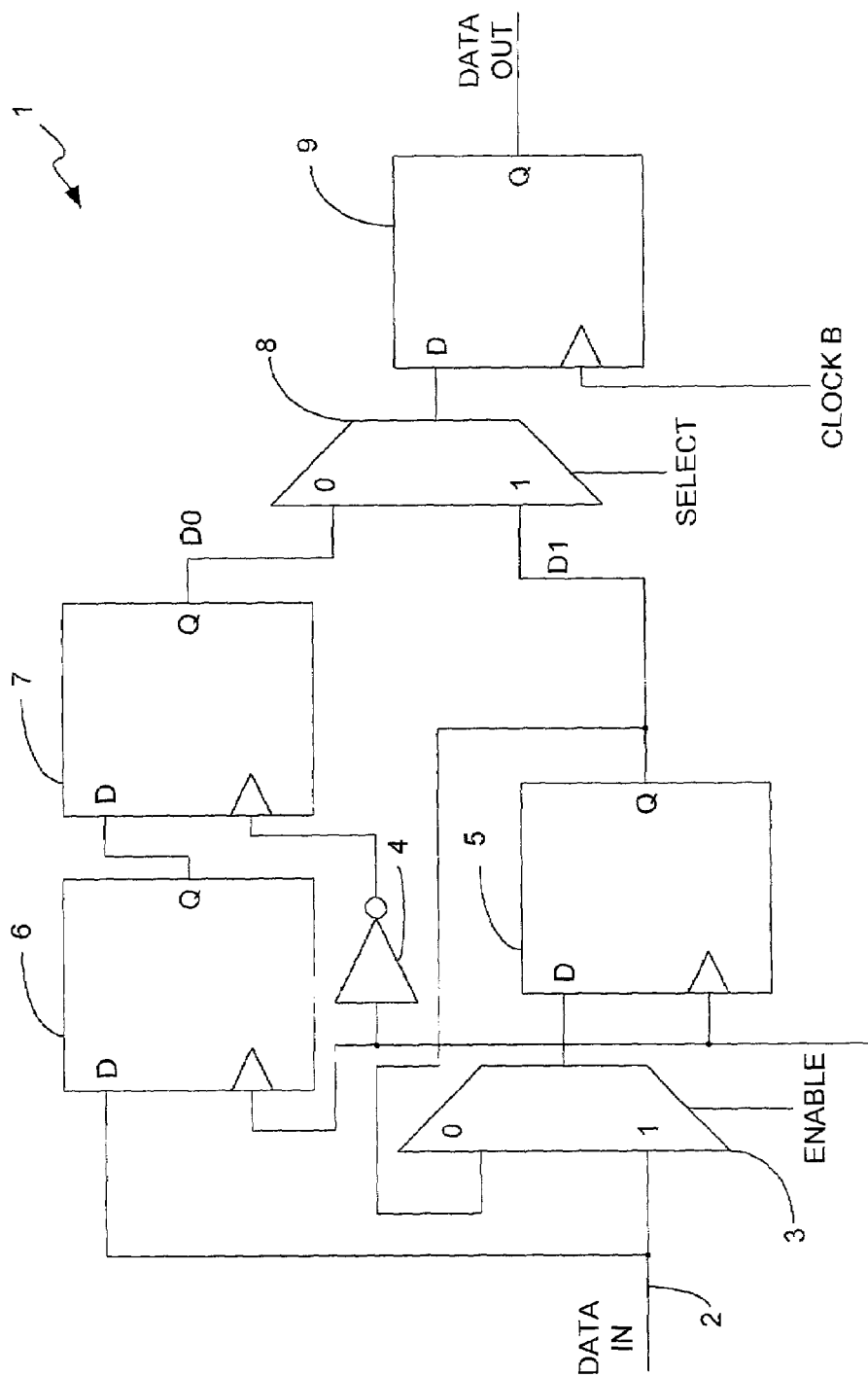
FIG. 1 is a block diagram of a first example embodiment of an N-to-N−1 clock ratio data synchronizer in accordance with the present invention.

FIG. 1 is a block diagram of a first example embodiment of an N-to-N−1 clock ratio data synchronizer 1 in accordance with the present invention. The data is input to the synchronizer 1 at input terminal 2 and is sampled by the higher clock domain, N. In this example, the ratio of N-to-N−1 is 5:4. Clock A corresponds to the higher clock domain and clock B corresponds to the lower clock domain. This means that for every 5 clock A cycles there will be 4 clock B cycles. In the higher frequency clock domain, it is known by the upstream logic that on a particular cycle, data cannot be transferred from the clock A domain to the clock B domain. This can be better understood from the timing diagram of FIG. 2.

Figure 2:
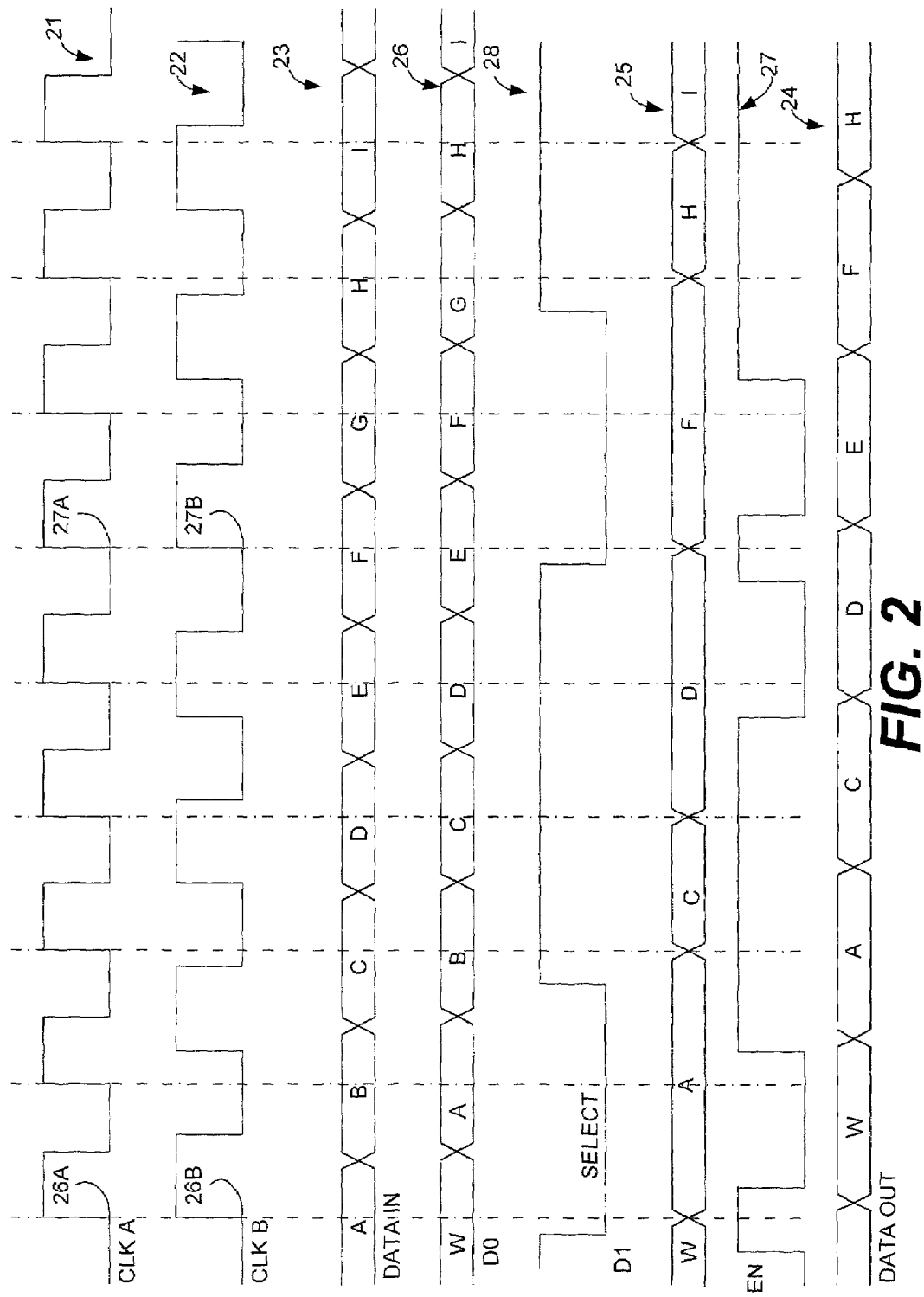
FIG. 2 is a set of waveforms drawn to facilitate the understanding of the example embodiment shown in FIG. 1.

FIG. 2 shows the relationship between clocks A and B 21 and 22, respectively, the Data In 23, which is data being clocked into the synchronizer 1 at the clock A rate, and Data Out 24, which is data being clocked out of the synchronizer 1 and the clock B rate. In the example shown in FIG. 2, the upstream logic knows that it cannot send the "B" data of the Data In 23 and therefore will either continue sending the A data that proceeds the B data for two clock A cycles or will send the A data for one clock A cycle and the C data for two clock cycles. This will occur whenever the rising edges of clocks A and B line up, which corresponds to edges 26A and 26B and edges 27A and 27B in FIG. 2. Thus, where clocks A and B are aligned at edges 26A and 26B, the D1 signal 25, which corresponds to the output of flip flop 5 in FIG. 1, will be held at the value of the A data for two clock A cycles. Similarly, where clocks A and B are aligned at edges 27A and 27B, the D1 signal 25 corresponding to the output of flip flop 5 in FIG. 1 will be held at the value of the F data for two clock A cycles. Therefore, neither the B or G data received at the Data In terminal 2 will propagate through to the output of the flip flop 5, which corresponds to the D1 signal.

However the D0 signal is output from the flip flop 7 at the clock A rate because the flip flop 6 outputs a signal whenever the clock A signal is high and the flip flop 7 outputs a signal whenever the clock A signal is low due to the inverter 4. Since there are two latches 6 and 7 placed in series that receive the data from the clock A frequency domain, the output D0 26 will be delayed by one and one half clock cycles.

The manner in which the output of flip flop 5 is controlled to hold the output D1 25 of the flip flop 5 at a particular value for two clock A cycles is controlled by the enable signal, which is labeled 27 in FIG. 2. The enable signal 27 controls multiplexer 3. When the rising edges of clocks A and B are aligned, as is the case at edges 26A and B and 27A and B, the enable signal 27 is high just long enough to cause the A data from the Data In terminal (waveform 23 in FIG. 2) to be input to the flip flop 5. The enable signal 27 goes low before the next rising clock A edge and stays low until after that rising edge of clock A. This causes the output D1 25 of flip flop 5 to hold the input A data value for two clock A cycles, i.e., for the clock A cycles intended to gate in the A and B data. Thus, the waveform 25 corresponding to D1 shows no B value, but shows two A values followed by a C value.

The same occurs with D input value shown in the Data In waveform 23. The enable signal 27 stays high until just before the rising edge of clock A that precedes the rising edges 27A and B of clocks A and B that coincide. By keeping the enable signal 27 high during this period, the output D1 25 of flip flop 5 tracks the Data In input 23 of the synchronizer at the clock A rate. In the clock cycle before edges 27A and B, the enable signal 27 is low so that the D data value is held for two clock cycles. Just before the rising edges of clocks 27A and 27B coincide, the enable signal goes high for a long enough amount of time to gate the F value into flip flop 5 and then goes low until after the next rising edge of clock A, thereby causing the F data value to be held as the D1 signal 25 for two clock A cycles, i.e., for the F and G clock A cycles. Therefore, the D1 waveform 25 shows no G data value, but instead shows two sequential F data values.

The D1 and D0 data values are presented to the multiplexer 8. When the select signal 28 is low, the D0 data value is gated through to the output of the flip flop 9. When the select signal 28 is high, the D1 data value is gated through to the output of the flip flop 9. The output of flip flop 9 is shown in FIG. 2 and is represented by waveform 24. It can be seen that, due to the timing of the select and enable signals, the Data Out waveform 24 includes all data values input into the synchronizer 1 except for the B and G data values. It can also be seen by a comparison of the Data Out waveform 24 to the Data In waveform 23 that the Data Out waveform 24 corresponds to the clock B cycle whereas the Data In waveform corresponds to the clock A cycle. This is also apparent from the fact that the flip flop 9 is controlled by clock B.

The upstream logic has a signal going to it that tells it when the clock A and clock B edges are aligned, which allows the upstream logic to know that it can hold back the B data for one clock A cycle and that there is no need for the upstream logic to back up the B data.

In order to ensure that all of these things occur, the timing of the select signal 28 and of the enable signal 27 is important. The select signal 28 needs to be high prior to the rising edge of clock B that occurs when the rising edges of clocks A and B coincide. It then needs to go low before the rising edges of clocks A and B line up and remain low until after the next rising edge of clock B. It should be high at all other times. The low time and location remain fixed for different clock ratios, but the high time will vary. The enable signal 27 needs to be low prior to the rising edge of clock A that occurs one cycle before the rising edges of clocks A and B that are coincidental. It then needs to be high prior to the rising edge of clock A that occurs when the clock edges are coincidental. It then needs to be low prior to the rising edge of clock A that occurs one clock cycle after the clock edges coincide. It should be high at all other times. These timing relationships also ensure that the D1 data value 25 will not be changing as the Select signal 28 is changing.

Figure 3:
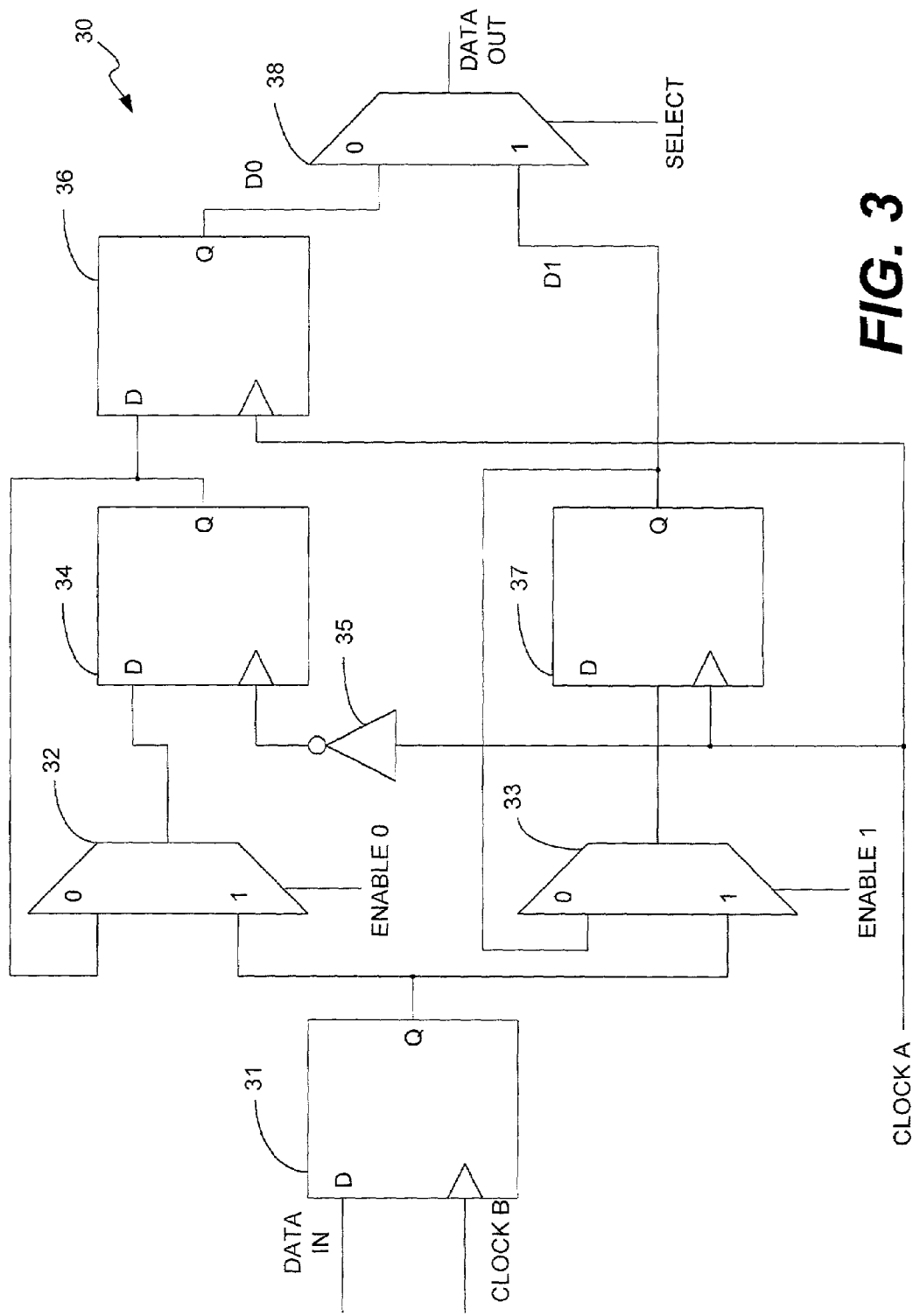
FIG. 3 is a block diagram of a second example embodiment of an N−1-to-N clock ratio data synchronizer in accordance with the present invention.

FIG. 3 is a block diagram of the N−1-to-N portion 30 of the synchronizer of the synchronizer of the present invention. As in the example embodiment of FIG. 1, N=5 and N−1=4. Therefore, in this case, the data is being transferred from a lower clock frequency domain to a higher clock frequency domain. In this example, the C data is repeated for two clock A cycles and the clock A logic (i.e., the downstream logic) will take this into account based on knowing when the two clock cycles are in alignment (i.e., when the clock A and clock B edges are coincidental).

The circuit 30 shown in FIG. 3 will be described with reference to the timing diagram of FIG. 4 and with respect to the block diagram of FIG. 3. The circuit 30 comprises a first input flip flop 31, which receives the Data In and clock B signals 41 and 42, respectively, shown in the timing diagram of FIG. 4. On the rising edge of clock B, one of the data values shown in the Data In waveform 41 is sampled by the flip flop 31 and gated through to the output, Q, of the flip flop 31. This output is simultaneously made available to the multiplexers 32 and 33. The multiplexers 32 and 33 are controlled by the Enable 0 and Enable 1 signals 43 and 44, respectively.

When the Enable 0 signal 43 is high, the output of flip flop 31 is made available to flip flop 34. When the Clock A signal 45 goes low, the inverter 35 inverts the clock A signal, thereby causing the flip flop 34 to sample the data output from the multiplexer 32 and gates it to the output of flip flop 34. On the next rising edge of the clock A signal, the output of flip flop 34 is sampled by flip flop 36 and gated through flip flop 36 to its output D0, which corresponds to waveform 46 in FIG. 4. Therefore, the D0 signal 46 corresponds to the Data In value delayed by two clock A cycles.

When the Enable 0 signal is low, the output of the flip flop 34 is held at its current value. When the clock A signal 45 goes high, the value being held at the output of flip flop 34 is again sampled by flip flop 36 and gated to the output of flip flop 36, which corresponds to the D0 signal 46. Therefore, while the Enable 0 signal 43 is low, the value of D0 will remain the same.

Figure 4:
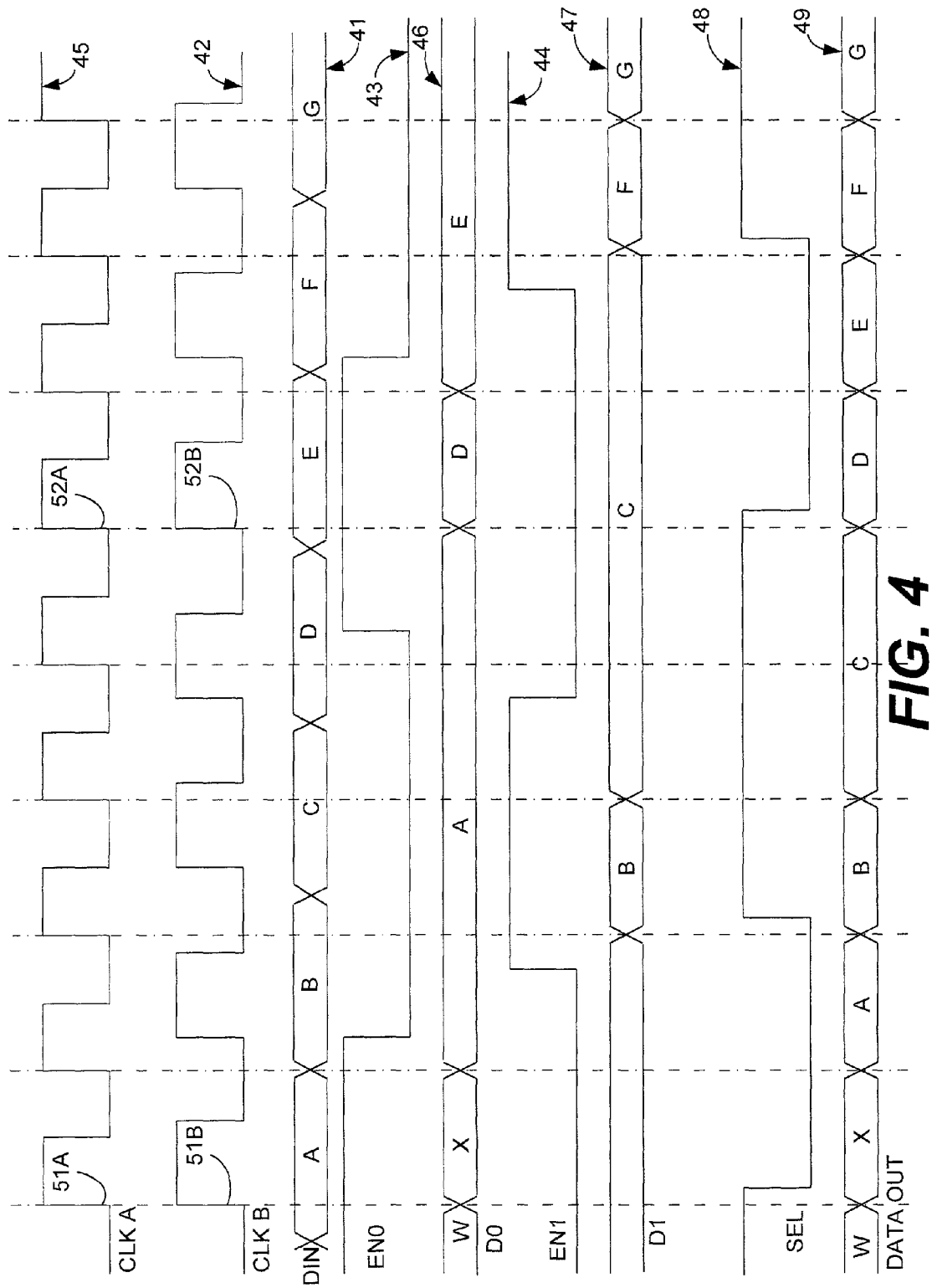
FIG. 4 is a set of waveforms drawn to facilitate the understanding of the example embodiment shown in FIG. 3.

As shown in FIG. 4, the Enable 0 signal 43 is high just before and just after the edges of clocks A and B coincide. Specifically, the Enable 0 signal 43 goes high prior to the falling edge of clock A that occurs just before when the rising edges of clocks A and B are coincident. It goes low prior to the second falling edge of clock A that occurs after the coincident rising edges of clocks A and B. The high time is fixed at two clock A cycles, but the low time will vary with the ratio of the clock frequencies. The coinciding clock edges are represented in FIG. 4 by numerals 51A and B and 52A and B.

The timing of the Enable 0 signal 43 with respect to the coincidental rising edges 51A, 51B, 52A and 52B of clocks A and B causes the D0 signal 46 to maintain the A data value of Data In 41 for four clock A cycles (i.e., for the A data value cycle and for the B and C data value cycles of the Data In 41). Identically, this timing causes the D0 signal 46 to maintain the E data for the E data value cycle and for the F and G data value cycles. This can be clearly seen from the data values of the D0 waveform 46 shown in FIG. 4.

With respect to the multiplexer 33, when the Enable 1 signal 44 is high and the clock A signal goes high, the data value at the output of flip flop 31 is sampled by flip flop 37 and gated through to the output of flip flop 37, which corresponds to the D1 signal 47. When the Enable 1 signal 44 is low, the output of the flip flop 37 is maintained at its current value and thus the D1 signal 47 is maintained at that same value. The Enable 1 signal 44 goes low before the rising edge of clock A that occurs one clock A cycle before when the rising edges of clock A and clock B coincide. It goes high before the rising edge of clock A that occurs two clock A cycles after the coinciding rising edges of clocks A and B. The low time is fixed at three clock A cycles, but the high time will vary with the ratio of the clock frequencies.

The flip flop 37 delays the Data In signal value output from flip flop 31 by one clock A cycle. The first value of the Data In signal 41 that appears in the D1 signal waveform 47 in FIG. 4 is the B value. The Enable 1 signal 44 is low for the next three clock A cycles after the C value is gated through to the output of the flip flop 37, the D1 signal 41 maintains the C data value for four successive clock A cycles (i.e., for the C data value cycle, for the D data value cycle and for the E data value cycle). This is indicated in the D0 waveform 47 shown in FIG. 4.

The Select signal 48 is timed to control the multiplexer 38 to select either the D0 or D1 signal to be output to the clock A frequency domain as Data Out 49. The Select signal 48 goes low just after the coinciding rising edges of clocks A and B. It then goes high just after the rising edge of clock A that is two cycles after when the rising edges of clock A and clock B coincided. The low time of the Select signal 48 is fixed at two clock A cycles, but the high time will vary based on the ratio of the clock frequencies. It is easy to see from the waveforms D0 46, D1 47 and Select 48 in FIG. 4 how the Data Out waveform 49 contains the data values shown. It can be seen from the Data Out waveform 49 that the C data value is output for two consecutive clock A cycles. As stated above, this is not a problem because the downstream logic (i.e., the logic of the clock A domain) knows when this will occur because it knows when the rising edges of the clocks will coincide and thus does not try to interpret the C data twice.

One of the advantages of the synchronizer of the present invention is that, because it uses flip flops instead of latches, the upstream logic is provided one full clock cycle for a signal to propagate through the upstream logic in the Data In path. As stated above, in previous synchronizer designs, latches have been used rather than flip flops, which resulted in variations in the amount of time available to the upstream logic. These variations, in turn, resulted in reduced setup time margins for the upstream logic.

Flip flops only change their outputs upon the occurrence of a particular triggering event, such as the rising edge of a clock. For example, a typical flip flop has a master-slave design and will sample the input while the clock is low, but the output will not change to reflect the sampled input until the rising edge of the clock. In contrast, whatever is on the input of a latch is reflected on the output of the latch when the latch is in the "transparent mode". In the non-transparent mode of the latch, the output holds whatever value was on the output at the time that the signal that triggered the latch was removed. The transparent nature of the latch can potentially cause problems in the upstream logic in terms of the amount of time that the upstream logic has to make the Data In value valid. In other words, it is possible that the upstream logic will not be able to meet setup time requirements.

Because flip flops are used in the synchronizer design of the present invention, the Data In value does not have to be valid until the very end of a clock cycle, since it will not be sampled until the rising edge of the next clock cycle. Therefore, the setup time requirements only need to take into account the rising edge of the clock cycle of the frequency domain of the upstream logic. Another advantage of this large setup time margin is that it allows more logic to be placed in the path in the upstream logic that is feeding Data In of the input flip flop of the synchronizer.

Another advantage of the synchronizer of the present invention is that, because flip flops are used in the synchronizer, more skew is allowed between the two clocks. This is due to the fact that data is only being allowed to change on the edge of a clock, as opposed to being allowed to change during the time period when the clock is high and/or during the time period when the clock is low. For example, in the embodiment of FIG. 1, D1 is only changing on the rising edge of clock A and D0 is only changing on the falling edge of clock A. This allows for a larger clock skew margin than with previous synchronizer designs.

Yet another advantage of the synchronizer of the present invention is that Data Out is provided a full clock cycle before it needs to be valid. This, in turn, provides the downstream logic in the path of Data Out with a full clock cycle before it needs to be ready to receive data, which results in greater setup time margins for the downstream logic. As with the upstream logic, this allows more logic to be placed in the path of Data Out, if desired.

It should be noted that the present invention has been described with reference to particular embodiments. However, as will be understood by persons skilled in the art in view of the discussion provided herein, the present invention is not limited to the particular embodiments described herein. For example, it is well known that logic can be implemented in different ways and with different components to achieve the same result. Therefore, it will be understood that the particular logic designs shown in FIGS. 1 and 3 have logical equivalents that are also covered by the present invention although they have not been specifically described herein. For example, flip flops can be added to either of the circuits shown in FIGS. 1 and 3 without changing the logical results, albeit the latency of the circuits might be changed. Also, inverters can be used in various ways without changing logical end results. These and other modifications are within the scope of the present invention.

What is claimed is:

1. A clock ratio data synchronizer, comprising:
    a plurality of flip flops, the synchronizer synchronizing data received by the synchronizer from first clock domain logic at a first clock frequency to a second clock domain logic at a second clock frequency, the first clock domain logic being controlled by a first clock that generates the first clock frequency, the second cloak domain logic being controlled by a second clock that generates the second clock frequency, the first and second clocks being synchronized to each other at regular intervals and having edges that coincide at the regular intervals,
    Data In input logic that receives data from first clock domain logic at an input of a first one of said flip flops, the first clock domain logic being controlled by a first clock at a first clock frequency, said first one of said flip flops sampling data received at an input thereof when an edge of said first clock is received by said first one of said flip flops, said first one of said flip flops outputting the data sampled thereby from an output thereof when an edge of said first clock is received by said first one of said flip flops;

synchronization logic that receives the data output from said first one of said flip flops, said synchronization logic including a first data path and a second data path, the data output from said first one of said flip flips being gated along the first and second data paths in accordance with one or more timing signals and edges of said first clock such that data from the first and second data paths is output from the synchronization logic in a predetermined order that resembles an order of the data received at the Data In input logic; and Data Out output logic that receives the ordered data from the synchronization logic in said predetermined order and outputs to ordered data from the synchronizer to second clock domain logic controlled by a second clock at a second clock frequency, the first and second clocks being synchronized to each other at regular intervals and having edges that coincide at the regular intervals; wherein the Data Out output logic includes an output flip flop that receives and samples the ordered data and that outputs the data sampled thereby at said second clock frequency when an edge of said second clock is received by said output flip flop.

2. The synchronizer of claim 1, wherein the synchronizer provides logic gates of the second clock domain logic that are in a signal path that is coupled to the Data Out output of the synchronizer with an second clock cycle as a setup time margin.

3. The synchronizer of claim 1, wherein the first and second data paths of the synchronization logic each comprise at least one synchronization flip flop that samples the data output from said first one of said first flip flips, each synchronization flip flop sampling the data output from said first one of said flip flops when an edge of the first clock occurs and outputting the data sampled by the respective synchronization flip flop when an edge of the first clock occurs.

4. The synchronizer of claim 1, wherein the synchronizer provides a clock skew tolerance margin with respect to the first and second clocks that is equal to at least half of whichever of the first and second clock cycles is shortest in time duration.

5. The synchronizer of claim 1, wherein the clock frequency of the first clock domain logic is higher than the clock frequency of the second clock domain logic.

6. The synchronizer of claim 1, wherein the clock frequency of the second clock domain logic is higher than the clock frequency of the first clock domain logic.

7. The synchronizer of claim 1, wherein a ratio of the first clock frequency to the second clock frequency is N:N−1, where N is an integer greater than or equal to 2.

8. The synchronizer of claim 1, wherein a ratio of the first clock frequency to the second clock frequency is N−1:N, where N is an integer greater than or equal to 2.

9. A clock ratio synchronizer for synchronizing data received by the synchronizer from a first clock domain operating at a first clock frequency to a second clock domain operating at a second clock frequency, the first clock frequency being generated by a first clock, the second clock frequency being generated by a second clock, the synchronizer comprising:

input logic that receives data from the first clock domain, the input logic including an input flip flop that samples data when an edge of said first clock is received by said input flip flop, wherein when an edge of said first clock is received by said input flip flop, said input flip flop outputs a data value corresponding to the data sampled by the input flip flop;

synchronization logic that synchronizes the data received at the input flip flop to the second clock frequency, the synchronization logic comprising one or more synchronization flip flops and one or more multiplexers, at least one of the synchronization flip flops sampling the data value output by said input flip flop when an edge of the second clock occurs, and wherein the data sampled by said at least one of the synchronization flip flops is output therefrom when an edge of the second clock occurs, and wherein each of the multiplexers receives a respective control signal that causes the respective multiplexer to output one of two data values received thereby when the respective control signal has a certain value; and output logic that receives data values output from said synchronization logic and outputs data therefrom at the second clock frequency into the second clock domain, the output logic comprising at least one output flip flop that samples data on an edge of said second clock and that outputs the data sampled by the second flip flop on an edge of said second clock.

10. The synchronizer of claim 9, wherein the first clock frequency is greater than the second clock frequency.

11. The synchronizer of claim 9, wherein the second clock frequency is greater than the first clock frequency.

12. The synchronizer of claim 9, wherein the first clock domain comprises first clock domain logic and wherein logic gates of the first clock domain logic that are in a signal path of the input logic of the synchronizer have a first second clock cycle as a setup time margin.

13. The synchronizer of claim 12, wherein the second clock domain comprises second clock domain logic and wherein logic gates of the second clock domain logic that are in a signal path of the output logic of the synchronizer have an entire second clock cycle as a setup time margin.

14. The synchronizer of claim 9, wherein the synchronizer provides a clock skew margin tolerance with respect to the first and second clocks that is at least half of whichever of the first and second clock cycles is shortest in time duration.

15. The synchronizer of claim 9, wherein a ratio of the first clock frequency to the second clock frequency is N:N−1, where N is an integer greater than or equal to 2.

16. The synchronizer of claim 9, wherein a ratio of the first clock frequency to the second clock frequency is N−1:N, where N is an integer greater than or equal to 2.

17. A method for synchronizing data received by a synchronizer from a first clock domain operating at a first clock frequency to a second clock domain operating at a second clock frequency, the first clock frequency being generated by a first clock, the second clock frequency being generated by a second clock, the first and second clocks being synchronized to each other at regular intervals and having edges that coincide at the regular interval, the method comprising the steps of:

receiving data from the first clock domain at an input of an input flip flop;

sampling the received data only on an edge of said first clock;

outputting data from an output of said input flip flop only on an edge of said first clock;

gating data output from the input flip flop along first and second data paths in accordance with one or more timing signals and edges of said first clock such that data from the first and second data paths is output in a predetermined order that resembles an order of the data received;
receiving the ordered data at an input of an output flip flop;
sampling the data received by the output flip flop only on an edge of said second clock; and
outputting data from an output of said output flip flop only on an edge of said second clock, wherein the first and second clocks are synchronized to each other at regular intervals and have edges that coincide at the regular intervals, and wherein logic gates of the first clock domain logic that are in a signal path that is coupled to the input of the first input flip flop are controlled in part in response to coincidence of the edges at the regular intervals to thereby provide the logic gates with at least a first clock cycle as a setup time margin.

* * * * *